(12) United States Patent
Nicponski

(10) Patent No.: US 7,672,497 B2
(45) Date of Patent: Mar. 2, 2010

(54) COMPUTER AIDED DISEASE DETECTION SYSTEM FOR MULTIPLE ORGAN SYSTEMS

(75) Inventor: Henry Nicponski, Albion, NY (US)

(73) Assignee: Carestream Health, Inc., Rochester, NY (US)

(*) Notice: Subject to any disclaimer, the term of this patent is extended or adjusted under 35 U.S.C. 154(b) by 792 days.

(21) Appl. No.: 11/554,647

(22) Filed: Oct. 31, 2006

(65) Prior Publication Data

US 2007/0165924 A1 Jul. 19, 2007

Related U.S. Application Data

(60) Provisional application No. 60/754,883, filed on Dec. 29, 2005.

(51) Int. Cl.
*G06K 9/00* (2006.01)
*A61B 5/00* (2006.01)

(52) U.S. Cl. ............... 382/128; 382/170; 600/300

(58) Field of Classification Search ............ 382/100, 382/128, 129, 130, 131, 132, 133, 134, 154, 382/168, 170, 173, 181, 193, 194, 199, 203, 382/232, 254, 274, 276, 286–295, 305, 312; 707/10; 600/300, 408; 378/4
See application file for complete search history.

(56) References Cited

U.S. PATENT DOCUMENTS

| | | | | |
|---|---|---|---|---|
| 5,873,824 | A * | 2/1999 | Doi et al. ................ | 600/408 |
| 7,236,619 | B2 * | 6/2007 | Doi et al. ................ | 382/128 |
| 7,244,230 | B2 * | 7/2007 | Duggirala et al. ......... | 600/300 |
| 7,490,085 | B2 * | 2/2009 | Walker et al. ............ | 707/10 |
| 2002/0164060 | A1 * | 11/2002 | Paik et al. .............. | 382/128 |
| 2002/0164061 | A1 * | 11/2002 | Paik et al. .............. | 382/131 |
| 2004/0024292 | A1 | 2/2004 | Menhardt et al. | |
| 2004/0109595 | A1 | 6/2004 | Luo et al. | |
| 2006/0110021 | A1 | 5/2006 | Luo et al. | |
| 2006/0110035 | A1 * | 5/2006 | Luo et al. .............. | 382/170 |

FOREIGN PATENT DOCUMENTS

WO WO 2007/037848 4/2007

OTHER PUBLICATIONS

David Paik et al., Surface Normal Overlap: A Computer-Aided Detection Algorithm With Application to Colonic Polyps and Lung Nodules in Helical CT, 2004 IEEE Transactions on Medical Images, vol. 23, No. 6, Jun. 2004, pp. 661-675.
Text Book—Richard O. Duda et al., Pattern Classification (2nd Edition) ISBN: 0471056693, Publisher: Wiley-Interscience (Oct. 2000).
Text Book—Bernhard Scholkopf et al., Advances in Kernel Methods: Support Vector Learning, ISBN: 0262194163, Publisher: The MIT Press (Dec. 18, 1998).
Summers, Ronald et al., Computer-Aided Detection of Polyps on Oral Contrast-Enhanced CT Colonography, American Journal of Roentgenology, Jan. 2005, vol. 184, No. 1, pp. 105-108, XP002453599.

(Continued)

*Primary Examiner*—Seyed Azarian

(57) ABSTRACT

A computer aided disease detection system and method for multiple organ systems. The method performs computer aided examination of digital medical images. A patient exam type of a digital medical image is determined. Based on the patient exam type, one or more of a plurality of knowledge based anatomical segmentation blocks are invoked, each block performing image segmentation for a single organ or organ system present in the image. Based on the patient exam type, for each successfully segmented organ or organ system, one or more of a plurality of knowledge based computer aided detection blocks are invoked, each block of which is designed to search for and locate potential disease foci in a particular organ or organ system.

18 Claims, 6 Drawing Sheets

OTHER PUBLICATIONS

Ge, Zhanyu et al., Computer-Aided Detection of Lung Nodules: False Positive Reduction Using a 3D Gradient Field Method and 3D Ellipsoid Fitting, Medical Physics, AIP, Melville, NY, US, pp. 2443-2454, XP012075414, 2005.

Dachman, Abraham H. et al., Quality and Consistency in CT Colonography and Research Reporting, Radiology, Oak Brook, IL, US, vol. 230, No. 2, Feb. 2004, pp. 319-323, XP002437951.

Hara, Amy K. et al., Incidental Extracolonic Findings at CT Colonography, Radiology May 2000, vol. 215, No. 2, May 2000, pp. 353-357, XP0024543600.

Van Ginneken, Bram et al., Segmentation of Anatomical Structures in Chest Radiographs using Supervised Methods: A Comparative Study on a Public Database, Medical Image Analysis, Oxford University Press, Oxford, GB, vol. 10, No. 1, May 24, 2005, pp. 19-40, XP005205979.

* cited by examiner

LINEARLY SEPARABLE PROBLEM WITH HYPERPLANE.
SUPPORT VECTORS ARE CIRCLED.

LINEAR, NON-SEPARABLE PROBLEM WITH HYPERPLANE. SUPPORT VECTORS ARE CIRCLED. TRAINING CASES THAT CANNOT BE CLASSIFIED CORRECTLY ARE AUTOMATICALLY INCLUDED AMONG THE SUPPORT VECTORS.

NON-LINEAR, NON-SEPARABLE PROBLEM WITH CLASSIFICATION SURFACE. SUPPORT VECTORS ARE CIRCLED.

COMPUTER AIDED DISEASE DETECTION SYSTEM FOR MULTIPLE ORGAN SYSTEMS

CROSS REFERENCE TO RELATED APPLICATIONS

Reference is made to, and priority is claimed from, commonly assigned Provisional Application No. 60/754,883, entitled "COMPUTER AIDED DISEASE DETECTION SYSTEM FOR MULTIPLE ORGAN SYSTEMS", filed on Dec. 29, 2005 in the name of Nicponski, and which is incorporated herein by reference.

FIELD OF THE INVENTION

The invention relates generally to the field of digital medical image processing, and in particular to a method and system for automated computer examination of medical imagery for the purpose of detecting likely disease sites in multiple human organ systems.

BACKGROUND OF THE INVENTION

Technological advances in the field of non-invasive imaging of the human body have produced gains in the ability of medical professionals to detect, diagnose, and treat diseases, thereby leading to improved outcomes and reduced morbidity and mortality. Advance in imaging resolution, functionality, and quality lead to new applications of the various imaging modalities for the benefit of patients and society in general. However, such advances incur human and financial costs, particularly in terms of the cost of imaging studies and the necessary professional medical expertise needed to utilize and interpret the resultant imagery. In the past decade, the rapid increase in three-and four-dimensional modalities (for example, computed tomography (CT), magnetic resonance imaging (MRI), single photon emission tomography (SPECT), and various others, along with rapid time sequences of such imaging operations) has led to an increase in the shear quantity of image data, and a concomitant increase in the demands and difficulty of physician interpretation of the imagery leading to subsequent diagnosis.

Improvements in technology often require parallel advances in multiple fields. State-of-the-art capabilities in automated computer image understanding are being applied to the problem of medical image understanding. Broadly, "image understanding" refers to the ability to create computer-based systems that mimic human capabilities to derive semantic-level (i.e., non-statistical and non-numeric) information from digitized images. Examples abound, and include such capabilities as face detection and recognition and scene classification. Much of current research related to automated understanding of medical images pertains to increased use of domain-expert knowledge (that is, anatomy and physiology) to raise the conceptual level of aids provided to the interpreters and other users of this imagery. Since the clinical practice of radiology faces a burgeoning information overload, hopes are being placed in the ability of advanced image understanding technology to aid the interpretive process. The TRIP initiative (Transforming the Radiological Interpretive Process) of the Society for Computer Applications in Radiology (SCAR) exists to foster research into assistive technologies that will boost capability, productivity, and accuracy in the extraction of diagnostic information from medical images, even in the face of proliferating data rates, types, and complexities.

Some believe that the practice of clinical radiology is approaching a "crisis" time in which the proliferating quantity and categories of medical imaging data are threatening to overwhelm the available professional interpretive skills necessary for its exploitation. The TRIP Initiative fosters innovative research to find promising technological and human-friendly advances to mitigate the inability to profitably handle overwhelming floods of imaging data. This initiative specifically addresses the potential of 3D image processing and the incorporation of expert medical knowledge into presentation systems as promising levers to raise the productivity and accuracy of radiological interpretation.

Among the tasks to which automated understanding of medical images might be applied, a need comprises the difficult task of disease detection in large data-volume medical images. There currently exist commercial and research-level computer-assisted detection (CAD) systems targeted to major diseases of organ systems, e.g., lung and colon cancer, operating with various medical imaging modalities, both two- and three-dimensional. A goal of such systems is to improve the accuracy and time efficiency of the medical professionals (usually radiologists) that interpret imaging studies. With respect to accuracy, the goal is to raise the rate of true detection of abnormal disease conditions, while not proliferating false findings. With respect to time efficiency, such systems serve to enable readers to evaluate studies more rapidly without loss of accuracy. This latter goal is particularly important as the data volumes involved in medical imaging studies increase rapidly as a result of increases in image resolution.

One impediment to the widespread acceptance of CAD systems concerns the legal and ethical responsibility enjoined upon the medical professional to discern incidental findings—that is, to detect abnormal pathologies that are outside the primary focus of the study. For example, a radiologist interpreting a Virtual Colonoscopy examination must also be alert for abnormal findings in the kidneys and liver as well. To date, CAD systems have been focused on the detection of disease in a single organ or organ system (e.g., the colon), requiring additional reader time to search for extra-colonic findings of medical significance. Thus, the ability for such CAD systems to substantially reduce interpretation time is greatly restricted.

Reference is made to the following references.

Commonly assigned US Patent Application Publication No. U.S. 2004/0024292 (Menhardt et al.), titled "System and Method for Assigning a Computer Aided Detection Application to a Digital Image", directed to a system and method which assigns specific computer aided detection algorithms to digital medical images based upon knowledge of the exam type and the imaging modality.

Commonly assigned U.S. Patent Application Publication No. U.S. 2006/0110035 titled "Method For Classifying Radiographs", filed on Nov. 23, 2004 to inventors Luo et al., directed to an exam type classification.

U.S. Patent Application Publication No. U.S. 2002/0164061A1, published on Nov. 7, 2002 to inventors Paik et al., titled "Method for Detecting Shapes in Medical Images".

U.S. Patent Application Publication No. U.S. 2002/0164060A1, published on Nov. 7, 2002 to inventors Paik et al., titled "Method for Characterizing Shapes in Medical Images".

SUMMARY OF THE INVENTION

An object of the present invention is to provide a computer aided disease detection system for multiple organ systems.

The present invention discloses a computer-aided disease detection system for multiple organ systems that can reduce the reading time for large-scale anatomical imaging studies of, e.g., abdomen or thorax, both two-and three-dimensional.

According to the present invention there is provided a method of performing computer aided examination of digital medical images comprising the steps of: determining the patient exam type of a digital medical image; under supervision of an exam control module, based on the patient exam type, invoking one or more of a plurality of knowledge based anatomical segmentation blocks; each block performing image segmentation for a single organ or organ system present in the image; under supervision of said exam control module, based on the patient exam type, for each successfully segmented organ or organ system, invoking one or more of a plurality of knowledge based computer aided detection blocks, each block of which is designed to search for and locate potential disease foci in a particular organ or organ system.

In an embodiment, the method may include the results from the previous blocks being reported to results reporting blocks suitable for each of the specific organ or organ system in view, for interpretation of the results.

The invention may also include the step of invoking, under supervision of said exam control module and based on the patient exam type, one of more of a plurality of computer aided disease diagnosis blocks, each block of which is designed to evaluate potential disease foci in a particular organ or organ system, to assess the likelihood of the organ containing actual disease processes.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
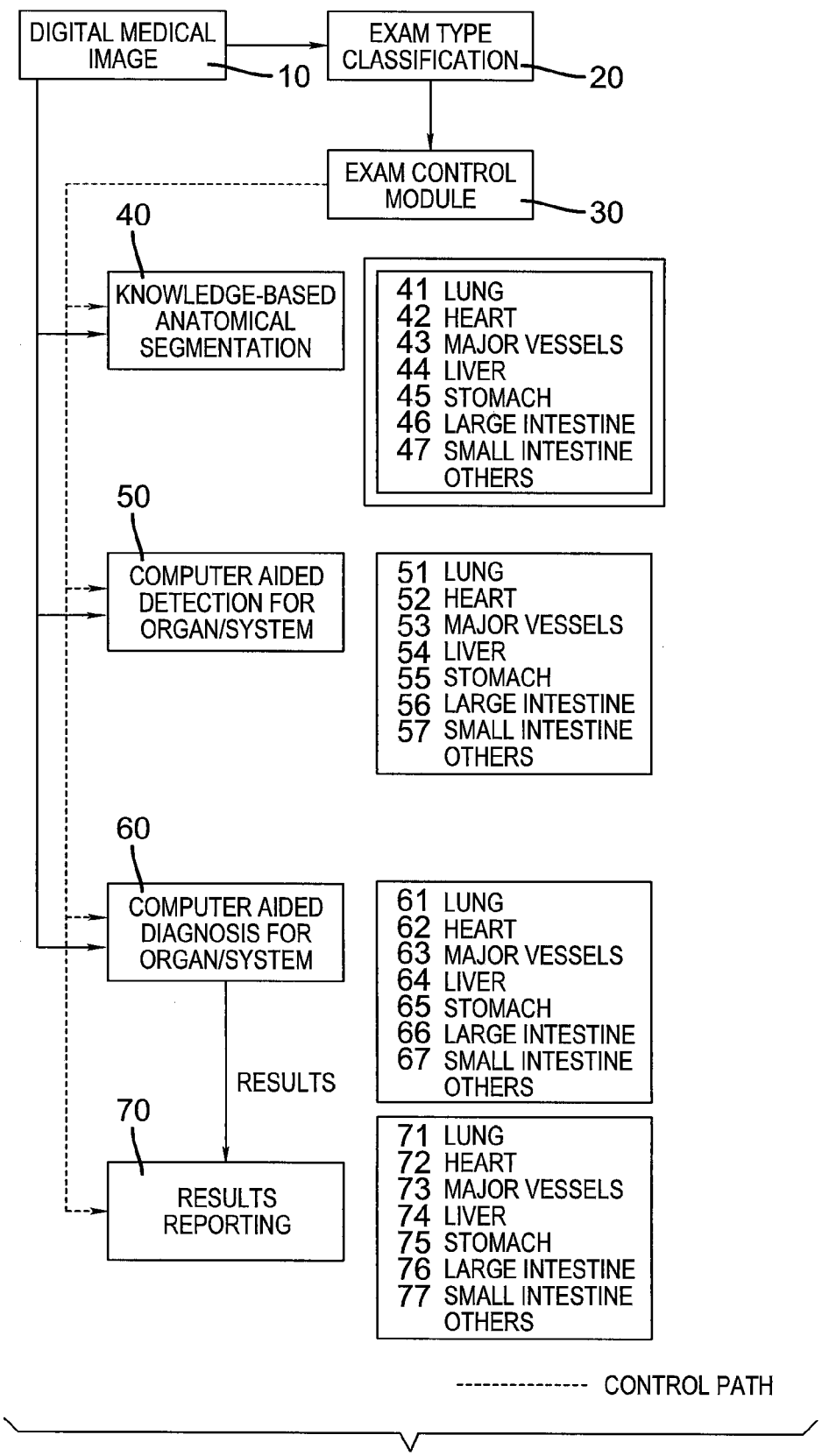
FIG. 1 shows a block diagram illustrating the present invention.

The following is a detailed description of the preferred embodiments of the invention, reference being made to the drawings in which the same reference numerals identify the same elements of structure in each of the several figures.

FIG. 1 shows a block diagram of the present invention. With reference to this figure, a digital medical image 10 is presented to the method. This image can be created by any of the well-known methods currently practiced in the medical field, e.g. computerized tomography. The image is preferably represented in the industry standard DICOM format.

A first stage of processing involves an optional exam-type classification step 20. The purpose of this step is to determine the specific patient anatomy that is present in the digitized image so as to direct the remaining processing to the specific organs or organ systems that are present in the image. For example, thoracic CT images contain information about patient lungs, heart, and major blood vessels. Abdominal CT images contain information about liver, stomach, large and small intestines, rectum, bladder, and kidneys. This step is optional because it can be replaced by either: (1) exam type characterization given explicitly as part of a standard image header data block (as in the common DICOM format); or (2) a user-initiated indication of exam type.

The exam type, whether determined automatically by the classification step 20 or by manual input or by parsing the digital image header, is provided to the exam control module 30. The purpose of the exam control module will be to manage operation of segmentation blocks 40, detection/diagnostic blocks 50 and 60, and results display blocks 70 that are suitable for the specific organs or organ systems that are expected to be present in the various patient exam categories to which the invention can be applied.

Next, under supervision of the exam control module 30, based on the type of patient imaging exam, one or more of a plurality of knowledge-based anatomical segmentation blocks, 40 are invoked to operate on the digital medical image. Each of these blocks performs image segmentation for a single organ or organ system known to be present in the digital image, due to knowledge of the patient exam type. (In this context, segmentation refers to the labeling of image pixels/voxels into sets (called maps)) that either reside within or outside a specified organ or organ system. The maps are often represented as binary images, in which the non-zero pixels or voxels represent a region or structure of interest, conventionally called the foreground. The zero pixels represent the remainder of the image region, called the background. Furthermore, segmentation can also include the creation of digital geometric models of the surface or volumes of the organ or organ system.) For example, thoracic CT images will be processed by segmentation blocks 41, 42, 43 in order to segment lungs, heart, and major blood vessels respectively. Abdominal CT images will be processed by segmentation blocks 44, 45, 46, and 47 in order to segment liver, stomach, large and small intestines, and kidneys, respectively. The result of the processing of the segmentation blocks 40 is the set of labels of the pixels/voxels and, possibly, the surface or volume models of the respective organs of organ systems. Since segmentation algorithms are not guaranteed to be successful, the segmentation blocks also generate control signals communicating the degree of success in segmentation of each of the potential organs or organ systems.

Next, under supervision of the exam control module 30, based on the type of patient imaging exam and the successful completion of knowledge-based anatomical segmentation, one or more of a plurality of knowledge-based computer aided detection blocks 50, and computer aided diagnosis blocks, 60, will be invoked. The digital medical images, along with the segmentation maps and optionally the surface or volume models appropriate to the specific organ or organ systems of interest, will be provided as input to the blocks. For example, the colon (large intestine) segmentation map, and a digital geometry colon surface model, with be provided as input to the colon computer aided detection block 56. The result of the processing of the computer aided detection blocks 50 will be spatial locations and detection scores of regions of the digital colon segmentation set or surface or volume model that are deemed to have a likelihood of containing either neoplastic adenoma or colorectal carcinoma. If a diagnosis block 60 is available for the specific organ or organ system under consideration, then the exam control module 30 may cause operation of that module following completion of the corresponding detection module for the same anatomical element. For example, the colon computer aided diagnosis block 66 will process the digital medical image, the colon segmentation map, and the colon computer aided detection results, and produce digital diagnosis for each potential disease candidate produced by the colon computer aided detection block 56. Example results in this case include the estimated size and volume of the disease candidate, and classification into categories of adenoma/carcinoma, and a diagnosis of benign/malignant. In each case of diagnosis, a confidence score can be provided, which is a real number in the range [0, 1]. A higher confidence score provides greater confidence that the estimated diagnosis produced by the corresponding diagnosis block is true and medically significant.

Following operation of the computer aided detection blocks 50 and the computer aided diagnosis blocks 60, results of the system may be displayed to the supervising physician or medical technician by results reporting blocks 70. Such results can include, but are not limited to, graphical displays of organ or organ system models with superimposed visual markings showing the locations, diagnoses, and confidences of the findings generated by the various processing blocks. Also, numerical and tabular displays of results can be made available. All of these results can be presented in conjunction with more familiar displays of the original digital medical images, to permit further investigations by medical personnel.

Still referring to FIG. 1, with regard to exam type classification 20, the optional exam type classification module 20 serves to automatically determine the medical type represented in the digital image. Examples of medical types include thoracic CT exam, abdominal CT exam, and craniocaudal and medio-lateral oblique mammography digital radiographic projections. This module is optional because the information it derives automatically from the digital image itself can also be supplied by manual input from a human operator, or extracted from the DICOM header information associated with the digital image.

Commonly assigned U.S. Patent Publication No. U.S. 2006/0110021 titled "Method For Recognizing Projection Views Of Radiographs", by Luo et al., filed Nov. 23, 2004, incorporated herein by reference, discloses a method for automatically recognizing the projection view of radiographs. The purpose of this method is to categorize the type of radiological imaging operation that resulted in a given digital image, and to identify what patient anatomy was imaged in the exam. While this reference discloses a method related primarily to 2D radiological imaging examinations, a person skilled in the art of image understanding recognizes that the method can be extended in a straightforward manner to the classification of digital imagery representing 3D imaging modalities. The objective of exam-type classification is achieved by the following steps: pre-processing an input digital image (optional), correcting the orientation of the digital image, extracting regions of interest from the digital image, and recognizing the exam type of the digital image. Preprocessing an input digital image comprises sub-sampling the original image, segmenting the image into foreground, background and anatomy, and removing the foreground regions from the image as well as normalizing the image intensity based on characteristics of the anatomy region. Correcting the orientation of the digital image comprises detecting the orientation of the digital image and reorienting the digital image accordingly. Extracting regions of interest from the digital image includes detecting the medial axis of the anatomy, determining the center, size and shape of regions of interest and locating the regions of interest in the radiograph. Recognizing the projection view of the digital image is accomplished by classifying the digital image with respect to all possible exam types, and combining the classification results to determine the most likely exam type represented by the digital image.

With regard to exam control module 30, referring to FIG. 1, the exam control module 30 serves to schedule and monitor completion of knowledge-based anatomical segmentation blocks 40, computer aided detection for organ/system blocks 50, computer aided diagnosis for organ/system blocks 60, and results reporting for organ/systems blocks 70. The exam control module 30 receives the exam type information from the exam type classification block 20, and uses that information to schedule the processing of one or more blocks in each category, related to the specific organ or organ system that is present in the exam type. If it is known that multiple organs or organ systems are present in the digital image due to the exam type information, then the exam control module will schedule the processing for all of the appropriate segmentation blocks 40, computer aided detection for organ/system blocks 50, computer aided diagnosis for organ/system blocks 60, and results reporting for organ/system blocks 70, that pertain to the organs or organ systems. To give a specific example, if the digital image 10 represents a thoracic CT image, then the exam control module 30 will invoke the large intestine knowledge based anatomical segmentation module 46, and, if the segmentation should be successful, the large intestine computer aided detection module 56, the large intestine computer aided diagnosis module 66, and the large intestine result display module 76, in that order; and similarly the analogous trio of modules 47,57,67,77 for small intestine, and 44,54,64, 74 for liver, and so forth for all organs or organ systems known to be present in the type of exam represented by the digital image, and that underwent successful segmentation.

Since anatomical segmentation modules can fail for various reasons, the exam control module contains control logic to invoke subsequent processing module only for organs or organ systems on which successful segmentations have occurred. Reasons for which segmentations might fail range from imaging collection-based, such as failure to capture the entire anatomical region occupied by an organ, to reasons inherent to the anatomy of an organ or organ system itself, such as the evidence of a collapsed colon which prevented complete segmentation.

Knowledge-based anatomical segmentation 40 is now described in detail employing an example method for using a priori anatomical knowledge to perform segmentation and surface/volume modeling of organs or organ systems. In order to make effective use of anatomical knowledge, it will perforce be necessary to tailor the segmentation and modeling effort to match the characteristics of the specific organ or organ system. Hence we specifically describe a segmentation and modeling algorithm designed to segment and provide an inner surface geometric model for the human colon (large intestine). It is understood that the method described here will require modification to operate successfully on other air-filled organs (e.g., lung) and that entirely different algorithms would be required for solid organs such as liver, and for major blood vessels.

Computer-assisted detection and diagnosis methods are increasingly used to facilitate the non-invasive method for screening for colorectal cancer termed "CT Colonography" (CTC) or "Virtual Colonoscopy" (VC). Colorectal cancer (CRC) is the second-leading cause of cancer-related deaths in the United States. Simple and almost completely effective screening for CRC is formally advised for all persons of age 50 years and over in the United States. The standard screening methodology involves an endoscopic examination (optical colonoscopy (OC)) of the inner surface of the colon by a gastroenterologist. Suspicious polyps and actual cancers can often be resected right at the time of evaluation, if detected. The mortality rate for the cancer remains high, however, because the screening examination is unpleasant and involves cathartic cleansing of the fecal contents of the colon. For this reason, the non-invasive alternative of CTC is being studied to see if its widespread implementation would decrease CRC mortality. CTC can be performed either with the same bowel preparation regime as OC, or alternatively without purgative cleansing. In the latter case, the residual fecal material must be tagged with a radio-opaque substance so that the material can be correctly identified in the CT imagery, and digitally "subtracted" away, so as not to conceal possible disease locations.

Figure 2:
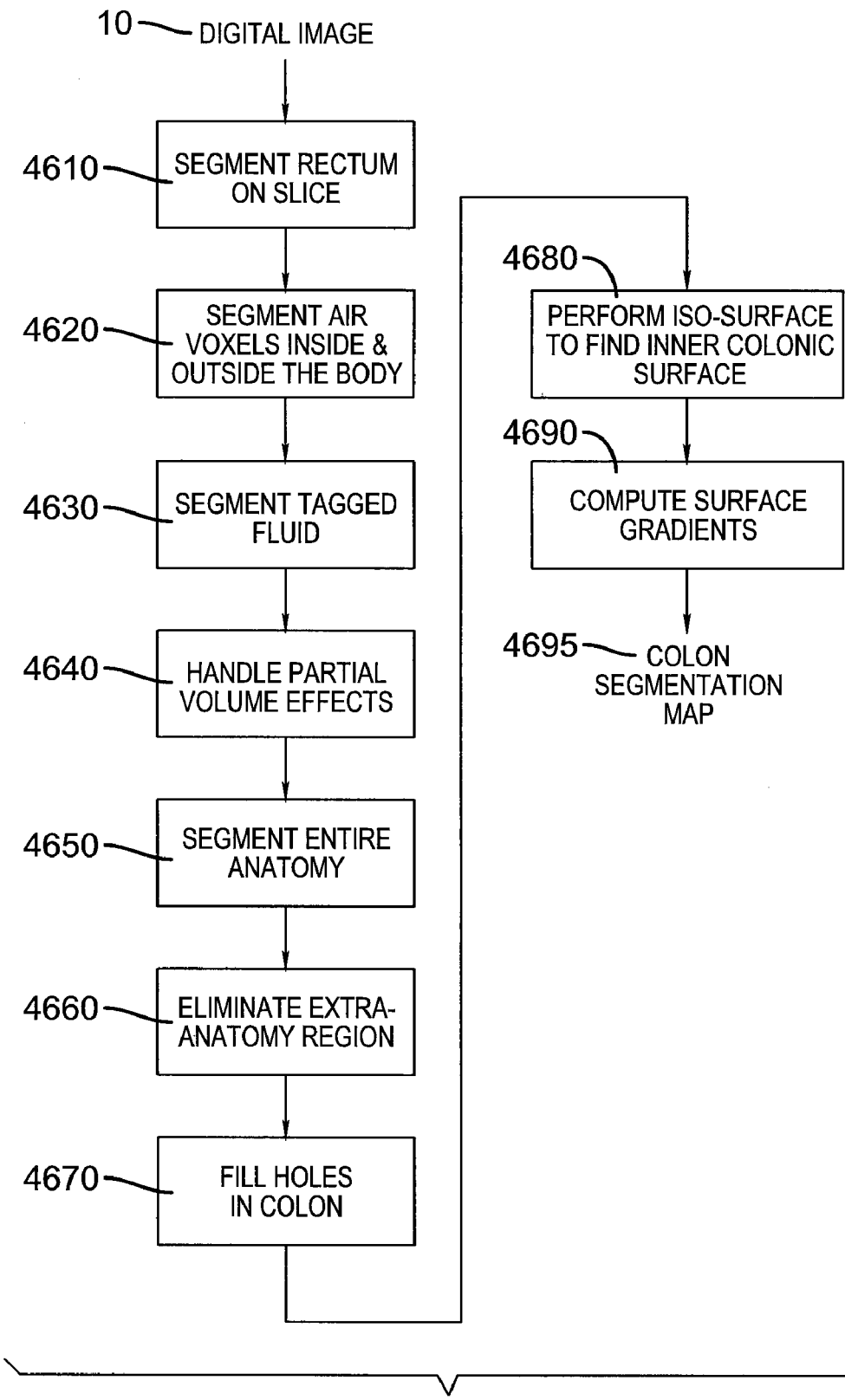
FIG. 2 shows a block diagram illustrating segmentation.
Figure 3:
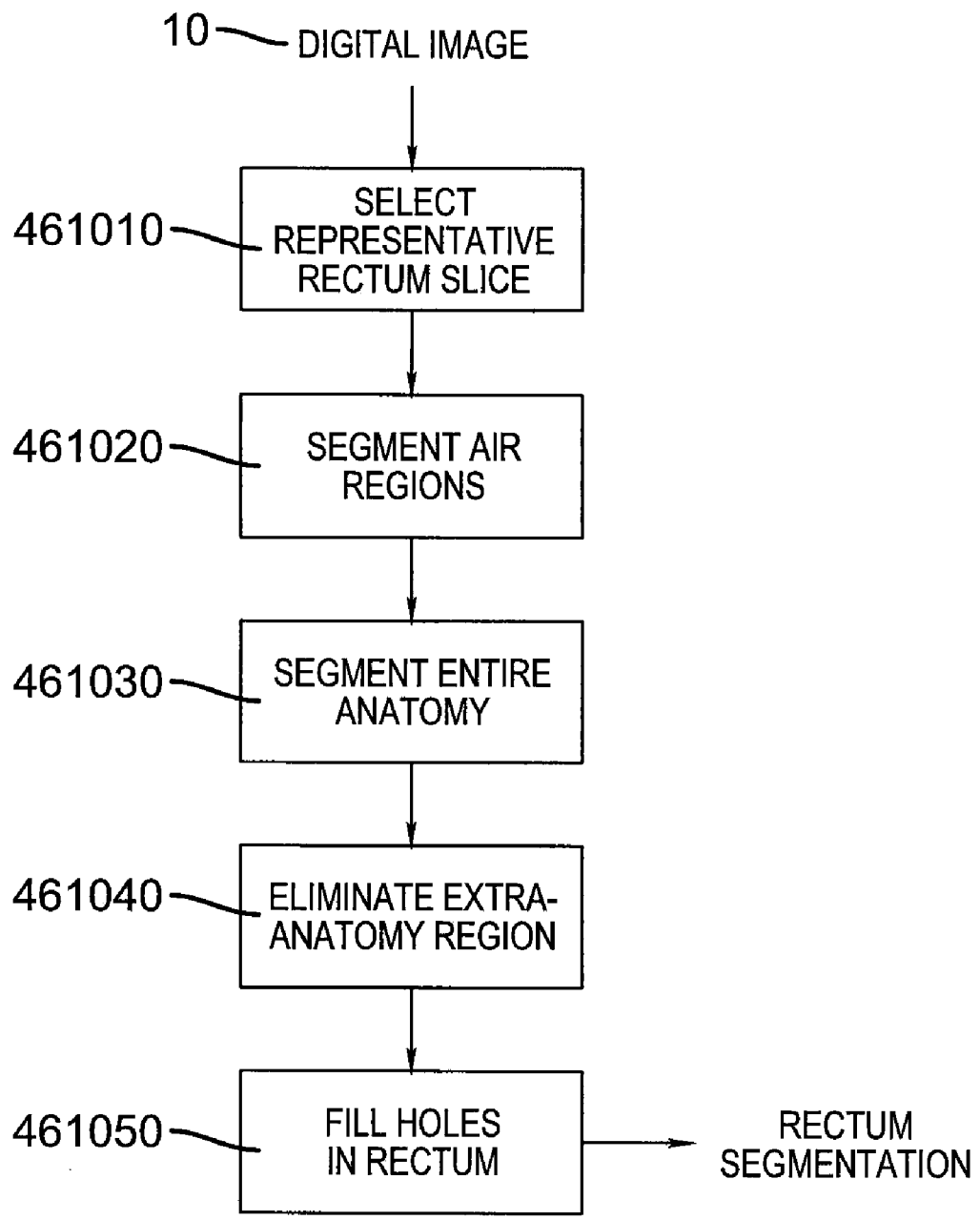
FIG. 3 shows a block diagram illustrating segmentation.

Referring now to the block diagrams in FIGS. 2 and 3, the method 46 to segment human colon begins with processing 4610 to segment the rectum region on a suitably representative plane of the imagery. Referring to FIG. 3, in step 461010, a representative rectum slice is selected. This selection can be conducted by a human user after presentation of the imagery planes in the expected z-axis region of the rectum, or performed automatically by searching in that z-axis region for the largest connected component of digital code values indicative of air-filled regions, which component in addition makes no contact with the outside edges of the image. Then, in step 461020, air-filled regions in that slice are identified by upper-bound thresholding with a digital value known to exceed the values typically representing air. For example, in CT images, a threshold value of 200 Hounsfield units will suffice. The entire anatomy region of the slice in segmented in step 461030, by first inverting the segmentation mask of the previous step and then filling interior holes using mathematical morphology operations well-known to those of ordinary skill in the art. Combination of the results of the two previous step, using a logical 'AND' operation in step 461040, leads to a segmentation of the region of the rectum alone. Finally, in step 461050, mathematical morphology operations are again applied to fill in holes interior to the rectum region itself.

With reference to FIG. 2, colon segmentation continues in step 4620 with segmentation of all likely voxels representing air, based on the statistics of the rectal region derived in step 4610. Specifically, denoting by $r_{min}$ and $r_{max}$ the minimum and maximum code values, respectively, in the segmented rectal region of the selected slices, all image voxels v whose code values obey:

$$r_{min} \leq v \leq r_{max}$$

are selected as part of the segmentation of air regions.

Next, in step 4630, a segmentation process identifies tagged fluid regions. These regions are identified with lower-bound thresholding with a digital value known to fall below the values typically representing tagged fluid. For example, in CT images, a threshold value of 1500 Hounsfield units will suffice.

Proper segmentation of colon surface at the interfaces between air, tissue, and tagged fecal material is comparatively difficult due to the so-called "partial volume effect", which is caused by the finite resolution of the imaging operation. Volumes in the region of imaging that consist of a mixture of materials will lead to digital code values intermediate to those of any of the individual materials alone. In step 4640, efforts are made to correct for the partial volume effect at the interfaces between colonic tissue and tagged fluid regions. (The interfaces between air and tagged fluid materials are not significant to the detection task.) To this end, morphological dilation operations are performed on the segmentation maps for both colonic tissue and tagged material. In each case, the dilation occurs in a single direction only—downward relative to gravity for tagged material (hence into tissue), and upward relative to gravity for tissue. The structuring element for the dilation will have a typical size of one or at most a few voxels. Then, the intersection between the two dilated segmentation maps is computed. This intersection region represents the voxels in which significant partial volume effects, with the potential to disrupt the disease detection process, will have occurred. These regions will be added back into the colon anatomy segmentation in step 4650.

Next, in step 4650, the entire anatomy region of the imaging volume will be segmented by inverting the air region segmentation from step 4620, and then filling in interior holes, including the lumen of the colon, using mathematical morphology operations. In step 4660, a segmentation of the entire colonic lumen is created by performing a logical AND operation on the entire anatomical segmentation from step 4650, with the result of a logical OR operation of the pertinent partial volume regions from step 4640 and the total air region segmentation from step 4620. Finally, in step 4670, any remaining holes within the segmentation of the colonic region are filled in using standard operations of mathematical morphology.

In step 4680, the entire region of the imaging volume, now represented by a complete binary 3D segmentation map with binary ones marking the region of the colonic lumen, and binary zeros marking all other regions, is subjected to a standard iso-surface processing to create a geometric model of the inner colonic surface. It will be clear to a person skilled in the art that use of the standard "Marching Cubes" algorithm can be used to obtain an iso-surface of value ½ from the segmentation map considered as a scalar field. The geometric model consists of a polygonal surface mesh comprised of vertices and their assembly into polygons. In addition to the surface model, the full-volume binary colonic lumen segmentation map will also be an output result of this step.

In step 4690, surface gradients will be computed at every vertex of the colon surface model. The gradients are computed using well-known means, from the original digital image data.

Computer aided detection method for organ or organ system 50 is now more particularly described. More particularly, a method for detecting potential disease locations in a medical image, as shown in FIG. 1. This method, while applicable to the case of detection of lung or colon cancer disease locations (blocks 51 and 56), must be understood to be of more widespread efficacy with other potential uses. This method is described here as a single instance of the types of computer aided detection blocks that can be included in the invention. It is noted that many other types of computer aided detection methods can be included as part of the invention.

The detection method is based on the concept that the disease targets of interest, colon or lung cancer, typically consist of spherical or irregularly globular tissue masses exhibiting higher x-ray attenuation than normal parenchyma (lung tissue), in the case of lung, or lumen (empty interior space), in the case of colon. Therefore, in such disease cases, considering the digital image as a mathematical scalar field, and computing the mathematical gradient vectors of the x-ray attenuation field, it will be seen that the gradient vectors in the neighborhood of a spherical or irregularly globular disease body will tend to coherently be oriented so as to direct jointly toward the volumetric centroid of such a body.

In Paik et al., "Method for Detecting Shapes in Medical Images," U.S. Patent Application Publication. No. U.S. 2002/0164061, a method is described for the detection of colon polyps through the accumulation of incidences of surface normal vectors at spatial locations in the colon. While this method may be able to find disease targets on the inner colon surface, it suffers from a difficulty in mapping detected surface normal overlap locations to the exact locations of the colon surface that gave rise to such overlapping surface normal vectors. Therefore, an improved method for finding colon polyp candidates is now described.

Continuing now to describe this detection method in the specific case of the colon, the anatomical structure of the human colon can be modeled as a long hollow tube or cylinder. While in reality, in the human body, the basic cylindrical shape of the colon will be seen to be tortuously twisted and convoluted, it remains nonetheless true that an appropriate mathematical model of the organ's inner surface, along with the interior lumen, is a topological cylinder. Colorectal cancer, and its precursor adenomatous neoplasm, occurs on the inner surface of the colon organ. Therefore, in this case, it suffices to examine the state of the digital imagery in the region of the inner colonic surface. As a result of the processing of the colon segmentation module 46, both a segmentation map and a model of the inner colonic surface will be forthcoming. The detection method constructs vectors normal to the located surface, of a fixed length related to the scale of disease candidates for which it searches (e.g., in this case, of about 10 mm in size as typically true for clinically significant lesions). Where spherical or irregularly globular disease structures are present, the fixed length vectors should strongly tend to cluster near the volumetric centers of the structures. In the vicinity of normal anatomical structures, such as locally planar interior colonic surface, or the locally half-cylindrical haustral folds on the same surface, the vectors will not cluster so tightly. In the published art there are other detection methods based on this principle, see for example D. S. Paik, C. F. Beaulieu, G. D. Rubin, B. Acar, R. B. Jeffrey, Jr., J. Yee, J. Dey, and S. Napel, "Surface Normal Overlap: A Computer-Aided Detection Algorithm With Application to Colonic Polyps and Lung Nodules in Helical CT," *IEEE Trans. Med. Imag.*, vol. 23, pp. 661-675, June 2004.

The detection method identifies at least one cluster of normal vectors by identifying centers around which normal vectors are clustered. The method is based on the concept that each center, called a centroid, is associated with the subset of surface vertices generating the normal vectors clustered around that centroid. A modification of the Linde, Buzo, and Gray (LBG) vector quantization (VQ) design algorithm can be used to iteratively calculate $2^n$ (n=0, 1, 2, ..., nsplit) centroids, which are points in 3-D space around which surface normal vectors cluster (a typical value for nsplit is eight). The xyz location of centroid k has the least mean square distance $D_k^2$ to the $N_k$ vectors (interpreted as geometric line segments) in its cluster. On the first iteration, all vectors are assigned to a single cluster. On each subsequent iteration, each existing centroid is split into two by slightly perturbing the single location of the centroid; vectors are reassigned to the nearest centroid by Euclidean distance; and centroid positions are recomputed.

For each centroid k (k=1, 2, 3, ..., $2^{nsplit+1}-1$), a computer-aided detection (CAD) score $S_k$ can be computed with the following 1-D Gaussian function:

$$S_k = \frac{N_k}{\sigma\sqrt{2\pi}} \cdot e\left(-\frac{D_k^2}{2\sigma^2}\right)$$

The parameter σ can be used to select different sizes of clusters (typical values are one or two). The largest CAD scores identify the centroids of greatest interest as potential disease sites.

Computer aided diagnosis method for organ or organ system 60 is now described in detail with regard to a method for diagnosing potential disease locations in a medical image. This method, while applicable to the case of diagnosis of lung or colon cancer disease locations (blocks 61 and 66), it is noted to be of more widespread efficacy with other potential uses. This method is described here as a single instance of the types of computer aided diagnosis blocks that can be included in the invention. It is noted that many other types of computer aided diagnosis methods can be included as part of the invention.

The diagnosis method first obtains a candidate shape from the detection step of determining centroids of clustered normal vectors and then associates a surface to the candidate shape consisting of the unique list of surface vertices associated with all centroids clustered in the candidate shape. Then the characterization method computes one or more parameters of the surface to the candidate shape. Depending on the values of these parameters, the method determines whether the candidate shape corresponds to a shape of interest. A detailed description of the preferred embodiment of the characterization method will now be described. The previous description of the detection method to detect shapes at an anatomical surface in a 3-D volumetric image will now be extended to illustrate the characterization method.

A first step is to map the CAD scores for the centroids back onto the surface vertices. This can be achieved by assigning to each vertex the maximum CAD score for the nsplit+1 centroids with which its surface normal is clustered. This results in a subset of centroids that are associated with surface vertices.

A next step is to find CAD hits. This can be accomplished by clustering the subset of centroids that are associated with surface vertices and are above a threshold CAD score, such that the centroids of a given cluster are connected by distances less than a fixed threshold, for example, 10 mm.

The surface of each CAD hit can be computed as the unique list of surface vertices associated with all centroids clustered in that hit. Parameters of this surface can be computed to generate classification features that—in addition to the CAD score—characterize each candidate shape and thereby help determine whether it corresponds to a shape of interest. Such parameters can include, but are not limited to, candidate parameters from the following list, which contains surface parameters associated most closely with the presence of colorectal cancer: 3D shape index, gradient concentration, CT values, curvedness, gradient magnitude, Hough transform, edge displacement field, stream line convergence, best fit circle radius, best fit circle residue, best fit quadratic residue, parallel line angle, best fit parallel line residue, $3^{rd}$ order moment invariants, sphericity, Gaussian curvature, region density, vertex count, wall thickness, volume, average neck curvature.

The actual disease candidate diagnosis can then be performed based on standard machine learning methods such as described in Duda, R. O., Hart, P, and Stork, D. G., *Pattern Classification*, $2^{nd}$ ed., John Wiley and Sons, New York, 2001. For completeness, a commonly-used classification machine is described below; the Support Vector Classifier (SVM), which is a preferred classification algorithm for this invention.

Results reporting 70 is now more particularly described.

Following processing of the appropriate collection of knowledge-based anatomical segmentation blocks 40, computer aided detection for organ/system blocks 50, and computer aided diagnosis for organ/system blocks 60, the exam control module will cause an appropriate set of results reporting blocks to be activated, one for each organ or organ system examined for disease candidates by the prior blocks. Each of these results reporting blocks will present the segmentation, detection, and diagnosis results for the target organ or organ system in a manner suited to the specific anatomy of its target.

A method is now described in detail for reporting potential disease locations in a medical image. This method is applicable to the case of detection and diagnosis of colon cancer disease locations (block 77). This method is described here as a single instance of the types of results reporting blocks that can be included in the invention. It is noted that many other types of results reporting steps can be included as part of the invention.

To present the results of a CT Colongraphy examination to an interpreting medical professional, it is necessary to provide multiple means for visualizing the original medical image data, along with the computer aided detection and diagnosis results. Currently, debate occurs within the medical community as to whether primarily 2D or 3D image display and interpretation works best for CTC. For this reason, the results reporting module 77 can provide for simultaneous 2D image display and 3D graphical model display of the inner colonic surface. Both displays include markers and annotations of the system's disease target findings, as well as measurement and other tools to improve the interpreter's ability to discriminate between true and false findings. At least one commercial company offers exemplary display tools, for example, Viatronix, of Stony Brook, N.Y.

Support Vector Machine Classifiers are now described. The present invention makes use of a number of classifiers based on the principle of the Support Vector Machine (SVM). SVMs are general data pattern classifiers that learn to perform their classification task based on the presentation to them of large numbers of labeled training examples. The machines make use of kernel methods for extending linear classification algorithms. Generally, an SVM implements a linear hyperplane classifier in some very high dimensional vector space whose dimensions encode mapped object features. In this invention, the object "features" can range from the pixel values in an image window to more sophisticated computations (for example, vectors of Gabor filter responses or wavelet transform coefficients). SVMs can be trained with combinations of those features as input vectors. Described now is a simple development of the basic principles of SVM training and application for classification.

Linear SVMs are known. In some situations, the data is separable, while in others, it is not.

With regard to the separable case, a simple case of an SVM classifier would be training and classification of data representing two classes that are linearly separable by a plane (or a hyperplane in higher dimensions). Consider the training data $\{x_i, y_i\}$, $I=1\ldots l$, $y_i \in \{-1,1\}$, $x_i \in P^d$, where the $y_i$ are the class labels. A hyperplane that separates the data satisfies $$w \cdot x + b = 0 \qquad \text{S1}$$

Figure 4:
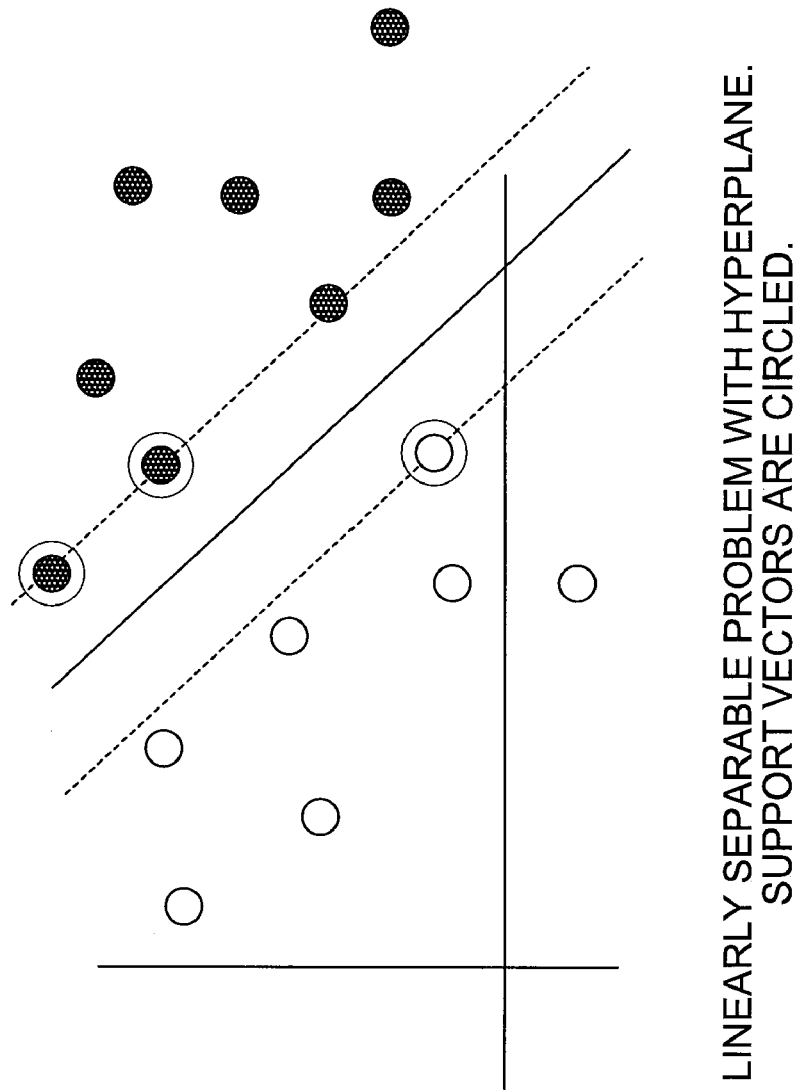
FIG. 4 shows a linearly separable problem with hyperplane wherein support vectors are circled.

A goal of training the SVM is to determine the free parameters w and b. FIG. 4 illustrates this separable case in $\Re^2$.

A scaling can always be applied to the scale of w and the constant b such that all the data obey the paired inequalities:

$$w \cdot x_i + b \geq +1, y_i = +1$$
$$w \cdot x_i + b \leq -1, y_i = -1 \qquad \text{S2}$$

which can be combined into:

$$y_i(w \cdot x_i + b) - 1 \geq 0, \forall i \qquad \text{S3}$$

By setting a proper scale, it is possible to require that at least one training vector satisfy each of the equalities (S2). Then, the margin (defined as the perpendicular distance between the hyperplanes that satisfy (S2) in the case of equality) is exactly $2/\|w\|$. The goal of the SVM training is to make the margin as large as possible, which is accomplished by minimizing $\|w\|$ subject to the constraints (S3). For convenience, let us consider minimizing instead, equivalently, the objective function $\|w\|^2$, again subject to the constraints (S3). (The choice makes the objective function convex.) Then, the optimization problem falls into the realm of classical convex optimization (also called quadratic programming). Using the method of Lagrange multipliers, a Lagrangian function is obtained with positive multipliers $\alpha_i$:

$$L = \frac{1}{2}\|w\|^2 - \sum_{i=1}^{l} \alpha_i y_i (x_i \cdot w_i + b) + \sum_{i=1}^{l} \alpha_i \qquad \text{S4}$$

Under the theory of constrained optimization, we must minimize the objective function and simultaneously require that the derivatives of the Lagrangian function with respect to all the multipliers $\alpha$ vanish, and also $\alpha \geq 0$.

Optimization problem (S4) is a convex programming problem: its objective function $\|w\|^2$ is convex, and the domain of $\alpha$ is also convex, being limited to the positive quadrant. For such problems, an alternative formation, called the Wolfe dual, exists in which the inequality constraints (S3) on the primary variables are replaced by equality constraints on the Lagrangian multipliers. The Wolfe dual of (S4) requires us to maximize L, subject to the constraints that the derivatives of L with respect to both the $\alpha$ and the primary parameters w and b vanish. Carrying out the differentiation results in the dual constraints:

$$w = \sum_i \alpha_i y_i x_i \qquad \text{S5}$$
$$\sum_i \alpha_i y_i = 0$$

Substituting the constraints (S5) into (S4) gives the following reformulated dual Lagrangian expression with the interesting property that the training data $x_i$ appear only in dot products. This allows extension of the SVM method to cases where the data are not linearly separable.

$$L_D = \sum_i \alpha_i - \frac{1}{2}\sum_{i,j} \alpha_i \alpha_j y_i y_j x_i \cdot x_j \qquad \text{S6}$$

By virtue of its construction, the Hessian matrix of this optimization problem is positive definite. For the original convex optimization problem (S4), a set of necessary and sufficient conditions can be established, called the KKT conditions. The KKT conditions include the original inequality constraints, the positivity of the Lagrangian multipliers, and the requirements that the partial derivatives of the Lagrangian function (S6) must be zero with respect to all the primal variables. These conditions are enumerated next.

$$w = \sum_i \alpha_i y_i x_i \qquad \text{S7}$$

$$\sum_i \alpha_i y_i = 0$$

$$y_i(w \cdot x_i + b) - 1 \geq 0, \forall i$$

$$\alpha \geq 0$$

$$\alpha_i(y_i(w \cdot x_i + b) - 1) = 0, \forall i$$

The KKT conditions allow examination of any single training case to see whether or not the value of its multiplier is consistent with an optimum solution. The final condition is called a complementarity condition. It states that inactive constraints (those that are not at the boundary of their feasible region) must have zero multipliers. Otherwise, the constraint might be perturbed and possibly move the objective function in the wrong direction.

Specific algorithms for solving the quadratic programming problem (S6) are well known and appear as standard capabilities of software libraries and tools such as MATLAB. However, depending on the size l of the training set, the training computations may quickly overwhelm the capabilities of even the best standard software routines. For example, if l=50 000, which is a reasonable value for the case of face detection, the Hessian (second derivative) matrix of the quadratic problem would require $l^2=2.5\times10^9$ entries. For this reason, the increasing use of SVMs has led to the development of "divide and conquer" algorithms for the optimization step.

The parameters $\alpha$ are of particular interest during the training process. Those training cases for which $\alpha_i$ ends up zero make no contribution to the decision hyperplane w through (S7, first equation). These cases are not pertinent and could be dropped from the training set with no noticeable effect. The cases for which $\alpha_i$ are non-zero are called support vectors and do influence the classifier. The hope at training time is that only a modestly small fraction of training cases will really contribute to the final decision surface. In fact, a result from statistical learning theory states that the smaller the fraction of training cases that are support vectors, the better the generalization performance of the classifier. If many or most of the training cases are support vectors, then the classifier might just be memorizing its training data, with little hope for successful generalization. (This situation is called "overtraining".)

When the optimization problem has been solved, the expression for w given in (S7, first equation) can be written in terms of the support vectors with non-zero coefficients and plugged into the equation for the classifying hyperplane (S1) to give the SVM decision function:

$$f(x) = w \cdot x + b = \sum_{i=1}^{l_s} y_i \alpha_i x_i \cdot x + b \qquad \text{S8}$$

where $l_s$ is the number of support vectors.

Classification of a new vector x into one of the two classes is based on the sign of the decision function.

With regard to the non-separable case, the extension of the SVM to the case when the data are not linearly separable requires the introduction of non-negative slack variables 41, and a parameter $\xi_i$, used to penalize classification errors on the training data. Note that the slack variables are not Lagrangian multipliers. Inequalities (S2) are replaced by:

$$w \cdot x_i + b \geq +1 - \xi_i, y_i = +1$$

$$w \cdot x_i + b \leq +1 + \xi_i, y_i = -1$$

$$\xi \geq 0 \qquad \text{S9}$$

The slack variables (which are not visible external to the training procedure of the SVM) will happily remain at zero unless a classification error occurs on the training set, when they must take on values greater than unity. Then, in order to assign a penalty to such errors, the objective function $\|w\|^2$ is replaced by $$\frac{\|w\|^2}{2} + C \sum_i \xi_i \qquad \text{S10}$$

The specific value of C that is used sets the relative importance of classification errors on the training data. The introduction of the slack variables affects the Wolfe dual formulation of the training problem only by imposing an upper limit on the value of the multipliers $\alpha$:

$$0 \leq \alpha \leq C \qquad \text{S11}$$

Whenever a training vector is mis-classified, its corresponding multiplier $\alpha_i$ will be bound to the value C. The SVM decision function is not affected by the slack variables.

The slack variables have greater impact on the KKT conditions. Since they are not Lagrangian multipliers, then from the viewpoint of constrained optimization they are primary variables with inequality constraints. Hence, a new set of non-negative Lagrangian multipliers $\mu$ must be introduced, leading to the following somewhat formidable set of KKT conditions:

$$w = \sum_i \alpha_i y_i x_i \qquad \text{S12}$$

$$\sum_i \alpha_i y_i = 0$$

$$C - \alpha_i - \mu_i = 0, \forall i$$

$$y_i(w \cdot x_i + b) - 1 + \xi_i \geq 0, \forall i$$

$$\alpha \geq 0$$

$$\xi \geq 0$$

$$\mu \geq 0$$

$$\alpha_i(y_i(w \cdot x_i + b) - 1) = 0, \forall i$$

$$\mu_i \xi_i = 0, \forall i$$

Again, the final two conditions are the complementarity conditions for inactive constraints. Note that neither the Lagrangian variables nor the slack variables will be visible to the user of the SVM once the classifier has been trained. Rather, these variables are temporary artifacts of the training process.

Figure 5:
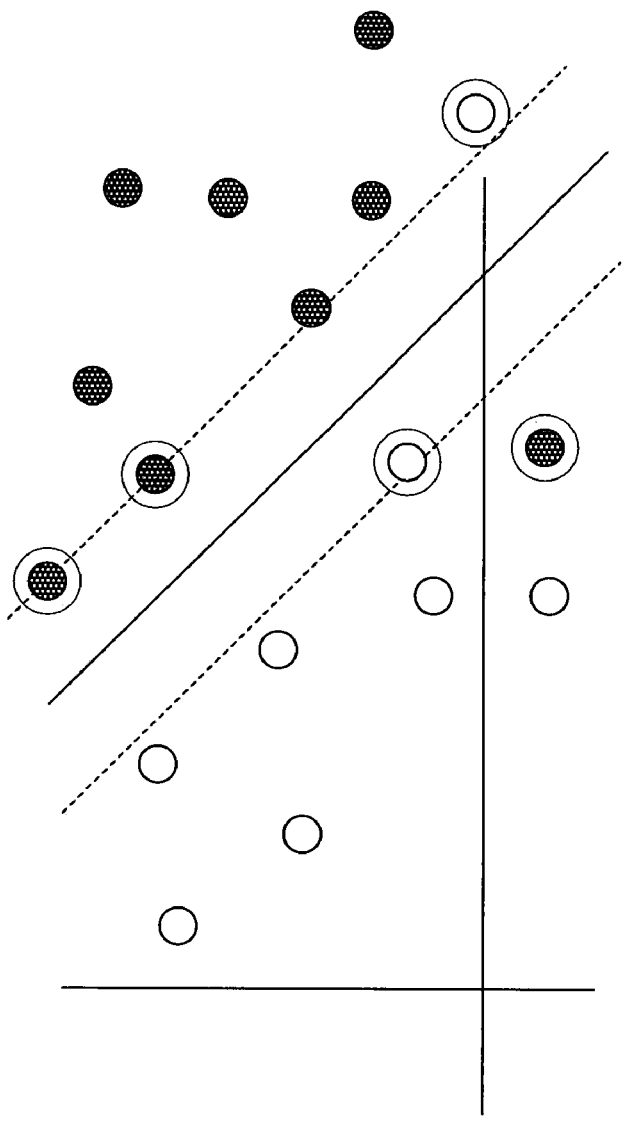
FIG. 5 shows a linear, non-separable problem with hyperplane, wherein the support vectors are circled.

FIG. 5 illustrates the linear, non-separable case. The decision function of the SVM remains as in (S8).

Non-linear SVMs are now described.

It is recognized that the task of face detection does not lead to a linearly separable problem, regardless of the feature set that is selected. Fortunately, the Wolfe dual formulation of the training problem (S6) leads to an almost trivial extension to the non-linear case by means of the introduction of a kernel function. Consider a mapping function $\Phi: \Lambda \to H$ that maps the input data from its natural vector space $P^d$ of (low) dimension d into a (possibly) much higher dimensional space H. Somewhat surprisingly, H can even have infinite dimensionality, although that case sends the mathematical journey off into less familiar waters, and will be ignored here. Suppose that before applying the SVM method outlined above, we first mapped the data, via the function $\Phi$ into the space H. Then, since the original training data had previously appeared only in dot products, the same will now be true of the mapped training data, which now appear only in dot products in H, which are functions of the form $\Phi(x_i) \cdot \Phi(x_j)$.

Now we introduce the kernel function. Suppose that a function K existed with the property:

$$K(x_i, x_j) = \Phi(x_i) \cdot \Phi(x_j) \quad \text{S13}$$

That is, the function K when applied in the low dimensional space gives the same scalar result as the dot product of its arguments mapped into the high dimensional space. Then, the data would appear in the training procedure and the decision function as arguments to the function K, and it would not be necessary to use the mapping $\Phi$ during training. Whenever the dot product of two vectors appears in the prior equations, it is replaced with $K(x_i, x_j)$. A simple example from [12] has $\Phi: P^2 \to P^3$ with:

$$\Phi(x) = \begin{pmatrix} x_1^2 \\ \sqrt{2}\, x_1 x_2 \\ x_2^2 \end{pmatrix} \quad \text{S14}$$

and then $K(x_i, x_j) = (x_i \cdot x_j)^2$.

This discussion on mappings and kernel functions clarifies that they permit the almost effortless extension of SVMs to operate on classification problems that are not linearly separable. Following the introduction of a kernel function, the resulting classifier still produces a hyperplane in H. However, in the natural data space $\Lambda$, the decision surface is now the "pre-image" of the hyperplane, under the inverse of the mapping function $\Phi$. This decision surface can be an almost unimaginably complex, non-linear manifold in $\Lambda$.

The selection of a kernel K does not automatically imply a unique corresponding mapping $\Phi$ and high dimensional space H: there may be zero or multiple mappings for which a given K is the kernel function. There are results from functional analysis that give conditions under which a specific kernel K corresponds to a unique mapping $\Phi$ and space H through (S13); these conditions, called the Mercer conditions, are given in Scholkopf, B, Burges, C., and Smola, A., *Advances in Kernel Methods*, MIT Press, Cambridge, 1999. The conditions guarantee that a kernel matrix K with elements $Kij \equiv K(x_i, x_j)$ will of necessity be a positive definite matrix. This quality of the kernel matrix enforces that the training problem of the (now non-linear) SVM remains a quadratic programming task. Some typical kernels include polynomial functions of the dot product of the vectors, radial basis functions (exponentials), and sigmoidal functions. Particular choices of the kernel function allow SVMs to simulate the behavior of commonly used pattern classifiers, such as feed-forward neural networks and radial basis function networks. However, the ensemble of possible SVM behaviors is much richer than the behavioral span of any of these other methods.

With the introduction of the kernel mapping, Wolfe dual objective function becomes $$L_D = \sum_i \alpha_i - \frac{1}{2} \sum_{i,j} \alpha_i \alpha_j y_i y_j K(x_i, x_j) \quad \text{S15}$$

The Mercer condition ensures that the Hessian matrix of the objective function remains positive definite, and hence the optimization problem is quadratic with a unique global optimum. The SVM hyperplane in H is now given by:

$$w = \sum_i \alpha_i y_i \Phi(x_i) \quad \text{S16}$$

and the SVM decision function is also adjusted accordingly:

$$f(x) = w \cdot \Phi(x) + b = \sum_{i=1}^{l_s} y_i \alpha_i K(x_i, x) + b \quad \text{S17}$$

Figure 6:
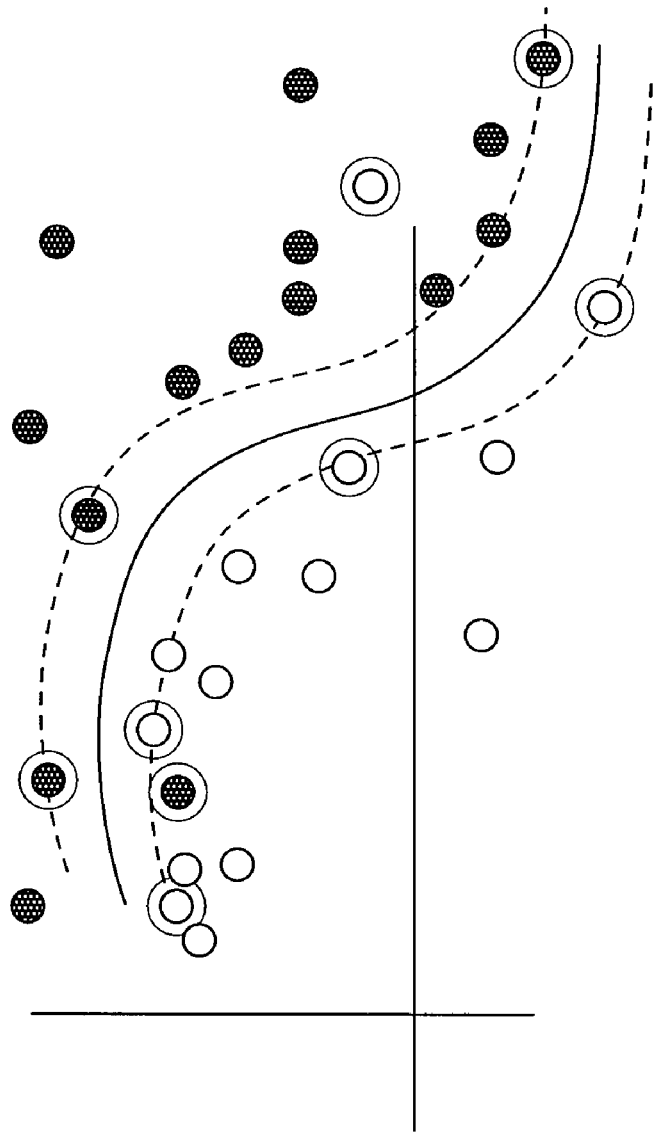
FIG. 6 shows a non-linear, non-separable problem with classification surface, wherein the support vectors are circled.

There is a subtle difference between (S8) and (S17), however. Due to the non-linearity of the kernel function K, the summation in (S17) can no longer be exchanged with a dot product as in (S8): the kernel function gets in the way. Hence, all $l_s$ kernel evaluations must be performed to evaluate (S17). FIG. 6 illustrates the non-linear, non-separable case in $\Re^2$.

In the description, a preferred embodiment of the present invention is described as a software program. Those skilled in the art will recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of performing computer aided examination of digital medical images, comprising:
   determining a patient exam type of a digital medical image;
   based on the patient exam type, invoking one or more of a plurality of knowledge based anatomical segmentation blocks, each block performing image segmentation for a single organ or organ system present in the image; and
   based on the patient exam type, for each successfully segmented organ or organ system, invoking one or more of a plurality of knowledge based computer aided detection blocks, each block of which is designed to search for and locate potential disease loci in a particular organ or organ systems,
   wherein the results from the previous blocks are reported to results reporting blocks suitable for each of the specific organ or organ system in view, for interpretation of the results.

2. The method as claimed in claim 1, further comprising the step of:
   invoking, based on the patient exam type, one or more of a plurality of computer aided disease diagnosis blocks, each block of which is designed to evaluate potential disease foci in a particular organ or organ system, to assess the likelihood of the organ containing actual disease processes.

3. The method as claimed in claim 1, wherein the determination of the patient exam type is performed by an automated classification means.

4. The method as claimed in claim 1, wherein the determination of the patient exam type is a result of a user input.

5. The method as claimed in claim 1, wherein the determination of the patient exam type is a result of information contained in the digital image header.

6. The method as claimed in claim 1, wherein the images are pre-processed prior to being classified as to exam type.

7. The method as claimed in claim 1, wherein segmentation includes the creation of digital geometric models of the surfaces or volumes of the organ or organ systems.

8. The method as claimed in claim 1, wherein the detection blocks identify spatial locations and/or detection scores of regions of the image deemed likely to contain a disease process.

9. The method as claimed in claim 8, wherein the detection blocks identify volumetric centers around which fixed length vectors cluster.

10. The method as claimed in claim 9, wherein the diagnosis blocks provide an estimated size of detected abnormalities.

11. The method as claimed in claim 10, wherein each diagnosis block is designed to evaluate and display the type and severity of disease processes detected to be present.

12. The method as claimed in claim 11, wherein a confidence score is provided for each case of diagnosis.

13. The method as claimed in claim 12, wherein the results reporting blocks report the results by two dimensional and three dimensional displays simultaneously.

14. The method as claimed in claim 13, wherein the results are presented together with the original digital medical images.

15. A system for performing computer aided examination of digital medical images, comprising:
   means for the determination of a patient exam type of a digital medical image;
   an exam control module;
   a plurality of knowledge based anatomical segmentation blocks, each performing image segmentation of a single organ or organ system known to be present in the digital image;
   a plurality of knowledge based computer aided detection blocks, each with specific anatomical knowledge tailored to a target organ/organ system:
   and a plurality of reporting and display blocks providing display of the results from the previous blocks to allow interpretation of the results, each tailored to visualization techniques best representing information concerning each specific anatomical target.

16. The system as claimed in claim 15, further including:
   a plurality of computer aided disease diagnosis blocks each with specific anatomical knowledge tailored to a target organ/organ system.

17. The system as claimed in claim 16, further including automated classification means for the determination of the patient exam type.

18. The system as claimed in claim 17, further including means for pre-processing the images prior to being classified as to exam type.

* * * * *